US006016902A

United States Patent [19]
Kwon

[11] Patent Number: 6,016,902
[45] Date of Patent: Jan. 25, 2000

[54] UPPER RAIL FOR PASSENGER CONVEYOR

[75] Inventor: Yi Sug Kwon, Kyongsangnam-Do, Rep. of Korea

[73] Assignee: LG Industrial Systems Co., Ltd., Seoul, Rep. of Korea

[21] Appl. No.: 08/956,024

[22] Filed: Oct. 22, 1997

[30] Foreign Application Priority Data

Oct. 22, 1996 [KR] Rep. of Korea ...................... 96-47431

[51] Int. Cl.[7] .................................................... B65G 23/12
[52] U.S. Cl. ............................................................ 198/332
[58] Field of Search .................................... 198/326, 330, 198/332

[56] References Cited

U.S. PATENT DOCUMENTS 2,128,310 8/1938 Margles .................................. 198/332
2,570,135 10/1951 Loughridge ............................. 198/332
2,617,515 11/1952 Hohnecker .............................. 198/332

FOREIGN PATENT DOCUMENTS 444075 3/1936 United Kingdom ................... 198/332

*Primary Examiner*—James R. Bidwell

[57] ABSTRACT

A passenger conveyor provided with a drive motor, a drive sprocket coupled to a shaft of the drive motor, a drive terminal gear coaxially engaged to the drive sprocket, a step chain driven by meshing with the drive terminal gear, a step connected to the step chain and having front and rear wheel rollers, and an upper rail for guiding the front wheel roller so that the step chain meshes smoothly with the drive terminal gear, wherein the upper rail comprising a straight section formed in a straight; an arched section formed extendly from an end of the straight section, wherein the starting end of the arched section coincides with or goes beyond a perpendicular center: line of the terminal gear; a distance from an upper surface of the straight section to a circumferencial surface of the terminal gear is shorter than a radius of the front wheel roller.

3 Claims, 9 Drawing Sheets

UPPER RAIL FOR PASSENGER CONVEYOR

BACKGROUND OF THE INVENTION

1. Field of the Invention

The present invention relates generally to a passenger conveyor such as an escalator, and more particularly to an upper rail for a passenger conveyor capable of reducing noises and vibrations generated due to the impact of the rear wheel roller of a step during its operation.

2. Description of the Related Art

A passenger conveyor typically includes a series of passenger platforms which are driven in an endless path between horizontally spaced landings. The most common types of passenger conveyors are escalators and horizontal walkways. In case of the escalator, the platforms are steps which are driven between an upper landings and a lower landing to facilitate the conveyance of passengers, cargo, and the like. The passenger conveyor also includes hand rails which are movable along and supported by opposite sides of a main frame of the conveyor.

The passenger platforms are normally connected in a circle by a pair of drive chains which extend along opposite sides of the passenger conveyor and which engage a drive sprocket assembly mounted on at least one end of the conveyor to effect continuous movement of the steps between the upper and lower landings. The steps extend laterally across the conveyor between the opposite sides of the main frame to define a step band that is a spatial envelope between the upper and lower landings and between the opposite handrails through which the steps travel. The steps, which convey passengers toward an off-load landing, travel above the sprocket assembly to define an upper step band, while the inverted steps which return to the on-load landing, travel below the sprocket assembly to define a lower band.

Such a conventional passenger conveyor will be explained in detail with reference to FIGS. 1 to 9. Referring to FIGS. 1 and 2, the conventional passenger conveyor comprises a pair of horizontally spaced circulating hand rails 1, a plurality of steps 2 which passengers get on and off, and a transmission system 3 for driving the handrails 1 and the steps 2. The transmission system 3 generally includes a motor 4 for driving the steps 2, a speed reducer 5 for transferring the driving force between the motor and a drive sprocket 7, and drive chains 6 operatively engaged with the drive sprocket 7. The driving force is produced from the motor 4 and transferred to the speed reducer 5 engaged directly to the motor. The driving force is transferred to the drive chains 6 by the drive sprocket 7 engaged with the speed reducer 5. The driving terminal gear 8 coupled coaxially to the drive sprocket 7 drives the drive chains 6 engaged with the steps 9. The steps travel upwardly and downward along the driving and driven terminal gears 8 and 11. Finally, the steps travel to convey passengers from a lower or upper floor to an upper or lower floor.

FIG. 3 illustrates a conventional upper rail 16, and FIGS. 4 and 5 illustrate an enlarged state of the conventional upper rail. As shown in FIG. 4, the steps rotate along the terminal gear 8 on the upper rail 16 of the passenger conveyor. The rear wheel roller 14' of the step rolls along the terminal rail 13, and the front wheel roller 14 of the step moves along the upper rail 16.

With the above structure, when the step chains 10 engaged with the front wheel roller 14 of the step couple to the terminal gear 8, the contact of the metals will produce shock sounds, there has been proposed a method in that the step chains can be coupled to the terminal gear with no strong impact by adjusting the position of the upper rail, which will be now explained with reference to the accompanying drawings.

FIG. 3 illustrates the structure of the conventional upper rails consisting of a arched section 18 and a straight section 19. The arched section 18 has a curvature of 200 millimeters and a length of 40 millimeters, and the straight section has a thickness of 16 millimeters, both of which are made of a mild steel. Width of the structure of the upper rails is of a somewhat wider than it of the front wheel roller 14. The upper rails 16 are disposed on each side of the conveyor and are secured by a bracket 30 of a frame 25 of the upper rail. The height of the upper rail 16 can be adjusted by interposing a thin metal piece such as a liner between the bracket 30 and the upper rail 16, or by bolting, welding or riveting.

As shown in FIG. 4, the height of the upper surface of the upper rail 16 positions below the front wheel roller 14 by a radius of the front wheel roller 14 of the step, and back and forth positions thereof are assembled in such a manner that the starting section of the arched section 18 coincides with the perpendicular center line of the terminal gear 8. Sometimes, for the purpose of reducing noises and vibrations the upper rail 16 is assembled at the position, about 3–4 millimeters, higher than the bracket 30.

When the conveyor moves, the step 9 travels in a clockwise or counter-clockwise direction by the drive terminal gear 8 and the driven terminal gear 11. As shown in FIGS. 1 and 2, the step chains 10 are moved by the drive terminal gear during moving. The front wheel roller 14 coupled to the step chains rolls along the upper rail 16, and the rear wheel roller 14' rolls along the terminal rail 13. Referring to FIGS. 4 and 5, the straight section and the arched section 10 of the upper rail positioned near the terminal gear performs the role of guiding to smoothly engage at an abutting portion 20 when the step chains are coupled to the terminal gear 8.

The front wheel roller of the step moves upward or downward to some extent, when it leaves from or lands on the arched section. This movement causes the front wheel roller of the step to leave or lands smoothly.

Because the terminal gear made of a mild steel rotates the step chains made of a steel, however, the vibrations and noises can be inevitably produced by the impact at the abutting portion which the step chains are coupled to the terminal gear as shown in FIGS. 4 and 5.

In order to prevent the impact phenomenon from being produced, the position to be coupled with the front wheel roller 14 and the step chains 10 is compensated by lifting the height of the upper rail 16 so that the step chains 10 may be coupled to the terminal gear 8 without occurring the impact at the abutting portion. If the position of the upper rail is adjusted higher to relief the impact, in case that the conveyor rotates in a clockwise direction, i.e., the steps ascend, no impact occurs at the abutting portion 20, thereby not producing the noise, as shown in FIGS. 6 and 7. In case the conveyor rotates in a counter-clockwise direction, thus the steps descend, the front wheel roller 14 of the step applies the strong impact to the arched section 18 of the upper rail, thereby producing the loud impacting sound, as shown in FIGS. 8 and 9.

When the conventional passenger conveyor moves which the upper rail is engaged in a normal condition, the noises and vibrations are produced from the abutting portion 20 of the terminal gear disposed in the upper of the conveyor. The noises and vibrations caused by the impact has been the chronic an inherent problem of the conventional conveyor in spite of continuous efforts to solve it.

In order to examine all possible factors of the above noises and vibrations, the noise measuring test was carried out by using so-called Taguji method. The testing result has revealed that the source of the periodical noises at the upper arched section of the conveyor is the impact of the terminal gear 8 and the step chains 10 at the abutting portion 20.

In order to eliminate or reduce the impacting sound as described above, the conventional passenger conveyor was incorporated with a method of lifting the height of the upper rail to prevent the step chains from impacting against the terminal gear at the abutting portion.

In the above method, however, in case the conveyor rotates in a clockwise direction thus the steps ascend, there is no happened any impact at the abutting portion, thereby no producing the noises. Meanwhile, in case the conveyor rotates in an counter-clockwise direction, thus the steps descend, the front wheel roller of the step applies strong impact to the arched section of the upper rail, thereby producing a loud impacting sound, as shown in FIGS. 8 and 9. At that time, the upper rail moves vertically, so the loud impacting sounds and vibrations are produced. Such a phenomenon is produced that because the arched section of the upper rail has a relatively shorten curved line, if the height of the upper rail is higher than the normal conditions, the terminal portion of the arched section 18 deviates from the trace of the front wheel roller of the step, depending upon the curvature of the terminal gear, as shown in FIGS. 8 and 9.

Summarizing the problems as mentioned above, in case of assembling the upper rail according to the normal fixing standards, the impacting sounds will be produced from the abutting portion 20, at every time the steps rotate in a clockwise or counter-clockwise direction. In case the upper rail is assembled at a higher position than the normal fixing standards, the front wheel roller 14 of the step strikes against the arched section 18 to produce a loud impacting sound.

SUMMARY OF THE INVENTION

In order to overcome the drawbacks as described above, an object of the present invention is to provide an upper rail for a passenger conveyor capable of preventing noises and vibrations from being produced due to the impact of a front wheel roller of a step.

Another object of the present invention is to provide an upper rail for a passenger conveyor capable of preventing noises from being produced due to the impact of the abutting portion of step chains and a terminal rail on clockwise moving, the strike of a front wheel roller of a step and an upper rail on counter-clockwise moving, and the impact of the abutting portion of the step chains and the terminal gear.

According to one aspect of the present invention, to achieve the above objects, there is provided a passenger conveyor provided with a drive motor, a drive sprocket coupled to a shaft of the drive motor, a drive terminal gear coaxially engaged to the drive sprocket, a step chain driven by meshing with the drive terminal gear, a step connected to the step chain and having front and rear wheel rollers, and an upper rail for guiding the front wheel roller so that the step chain meshes smoothly with the drive terminal gear, wherein the upper rail comprising a straight section formed in a straight; an arched section formed extendly from an end of the straight section, wherein the starting end of the arched section coincides with or goes beyond a perpendicular center line of the terminal gear; a distance from an upper surface of the straight section to a circumference surface of the terminal gear is shorter than a radius of the front wheel roller.

Preferably, a length of the arched section is to be an ⅛ length of the terminal gear circumference. The arched section has the same curvature as in the terminal gear, or the curvature of the arched section is somewhat shorter than that of the terminal gear. And preferably, a width of the upper rail is wider than that of the front wheel roller of the step.

With the upper rail for the passenger conveyor according to the present invention, when the passenger conveyor rotates in a clockwise or counter-clockwise direction, the upper rail is engaged at the higher position than the prior art, the front wheel roller of the step moves above the upper rail which the height of the upper roller is lifted, so that the step chains do not impact against the abutting portion of the terminal gear. Also, when moving in counter-clockwise, the starting point of the arched section coincides with or goes somewhat beyond a perpendicular center line of the terminal gear and the front wheel roller of the step softly landed on the arched section, which the curvature of the arched section of the upper rail is the same or shorter somewhat than that of the terminal gear. Accordingly, the impacting sound produced due to impacting the front wheel roller of the step against the upper rail is not happened, and vibrations is significantly reduced by no impacting the step chains against the abutting portions of the terminal gear.

BRIEF DESCRIPTION OF THE DRAWINGS

The above objects, other aspects, and advantages of the invention will become apparent by describing the preferred embodiment thereof with reference to the accompanying drawings, in which.

DETAILED DESCRIPTION OF THE PREFERRED EMBODIMENT

Figure 1:
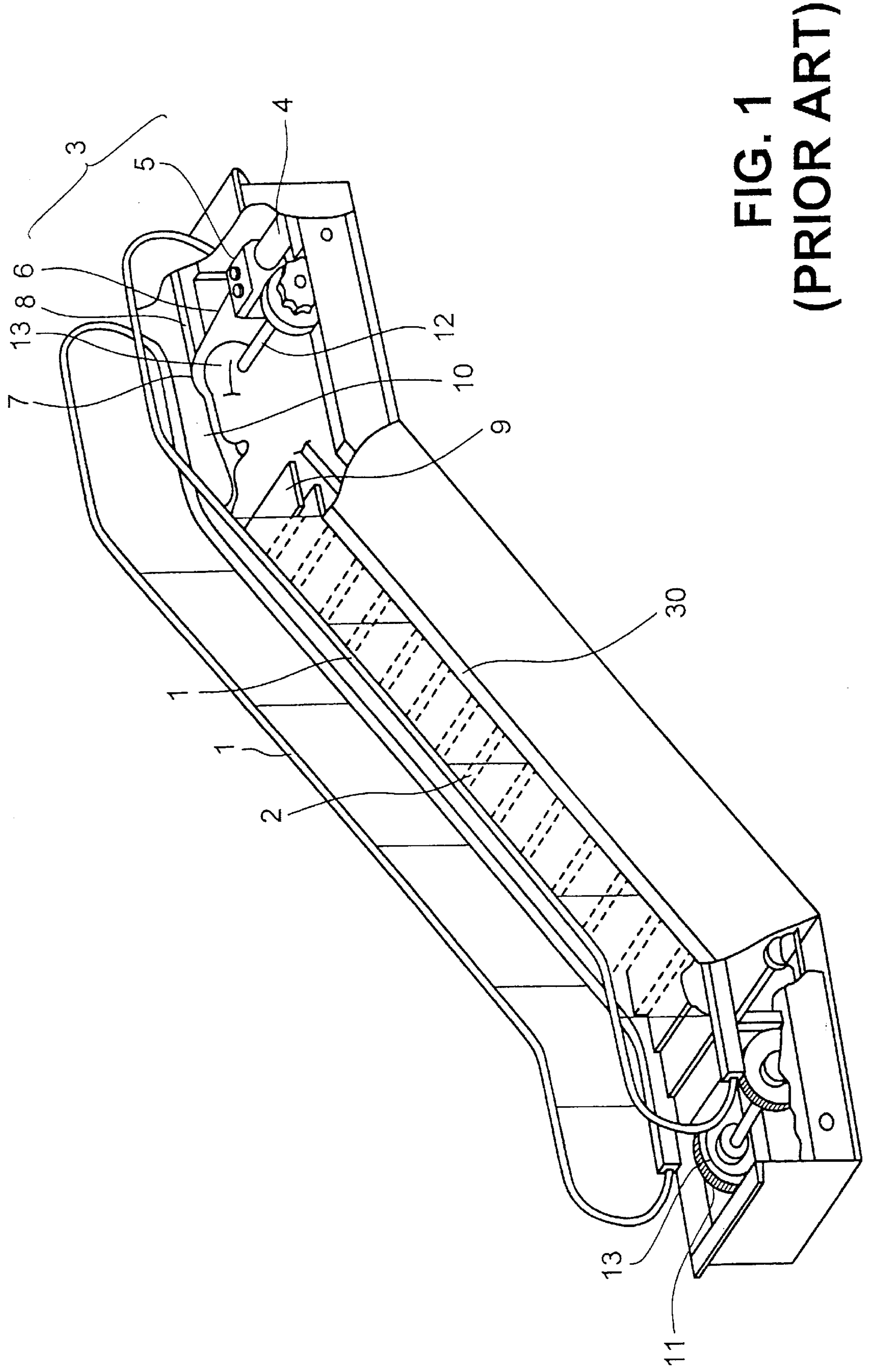
FIG. 1 (PRIOR ART)
FIG. 1 is a partially cutaway view in perspective of the structure of a conventional passenger conveyor.
Figure 2:
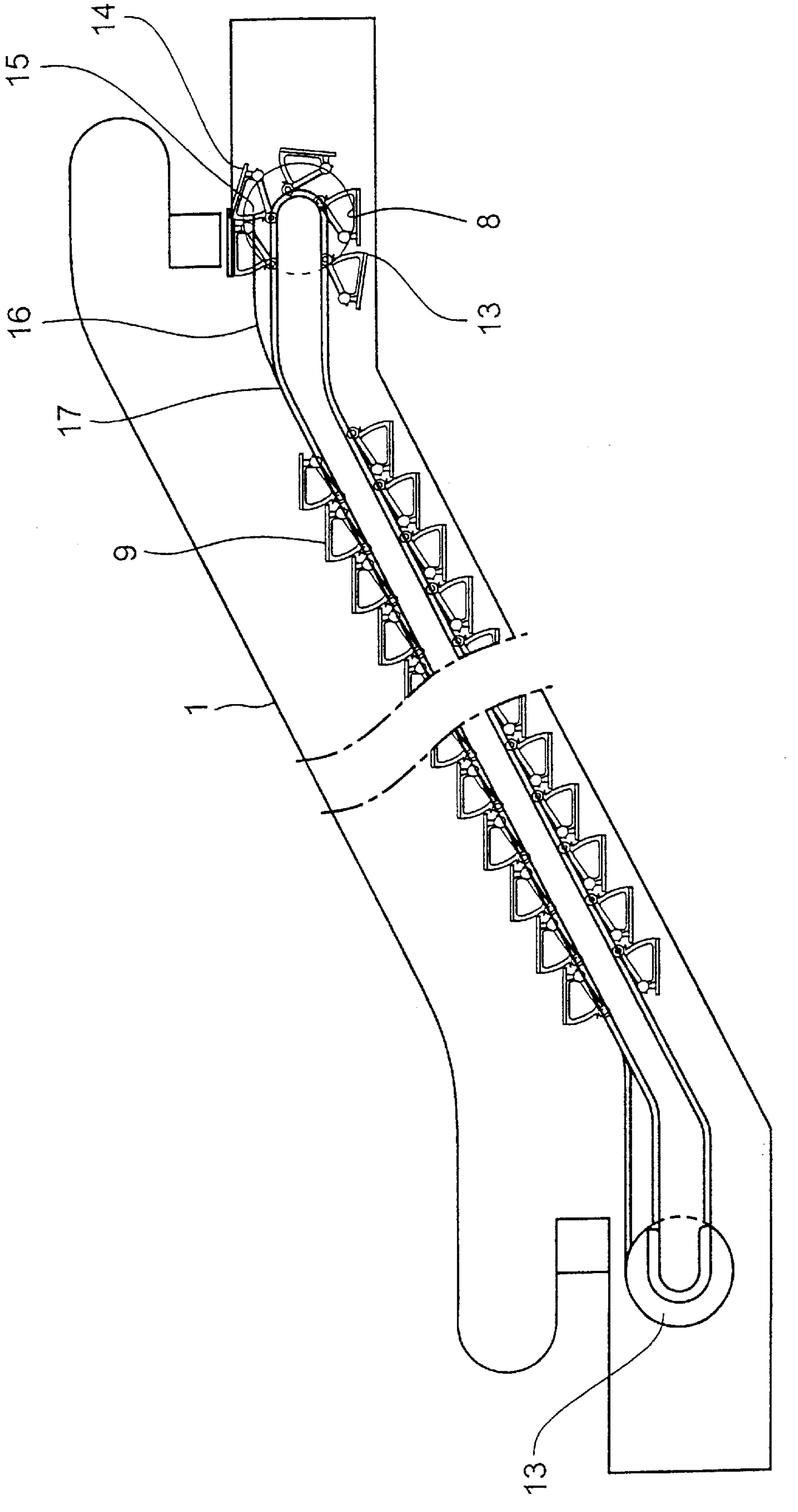
FIG. 2 (PRIOR ART)
FIG. 2 is a side view of FIG. 1.
Figure 3:
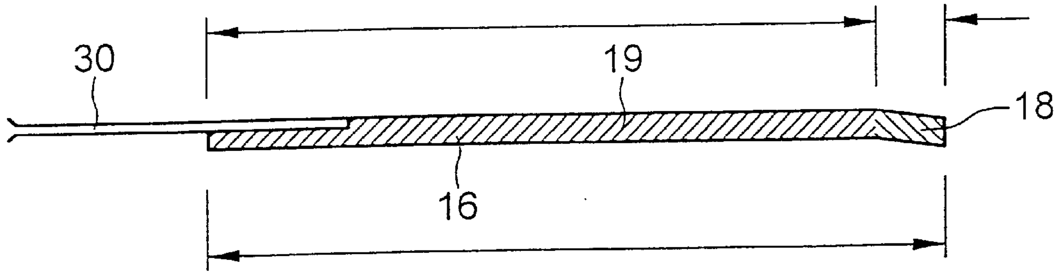
FIG. 3 (PRIOR ART)
FIG. 3 is a perspective view showing the structure of an upper rail for the conventional passenger conveyor.
Figure 4:
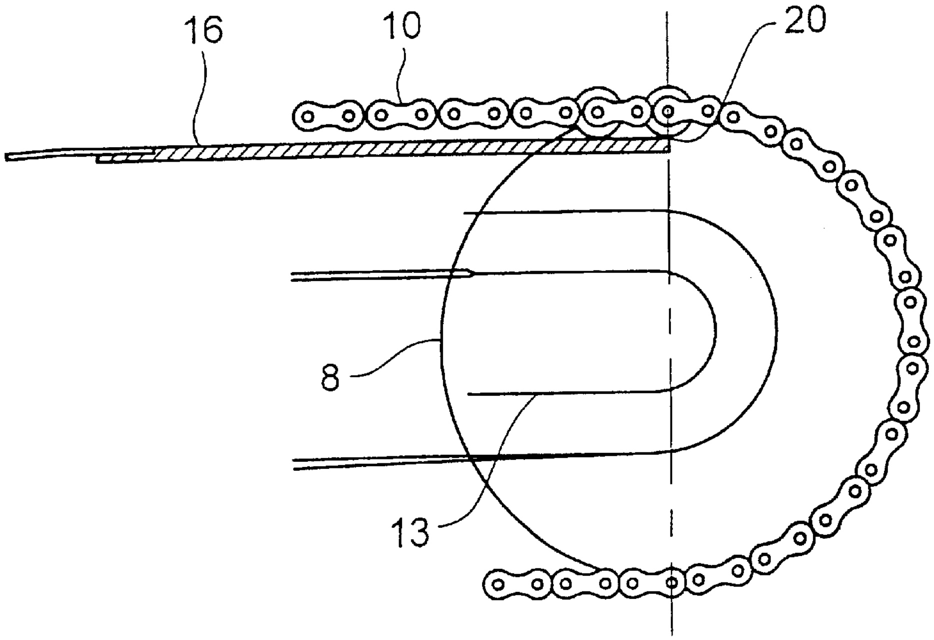
FIG. 4 (PRIOR ART)
FIG. 4 is a sectional view explaining the operation of the upper rail and the step chains of the conventional passenger conveyor.
Figure 5:
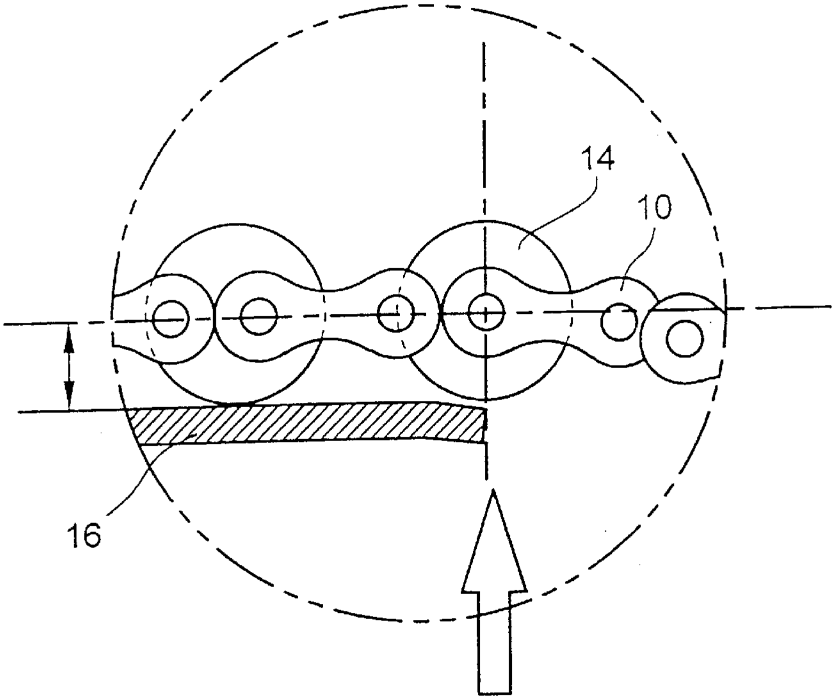
FIG. 5 (PRIOR ART)
FIG. 5 is an enlarged view showing the upper rail and terminal gear of the conventional passenger conveyor.
Figure 6:
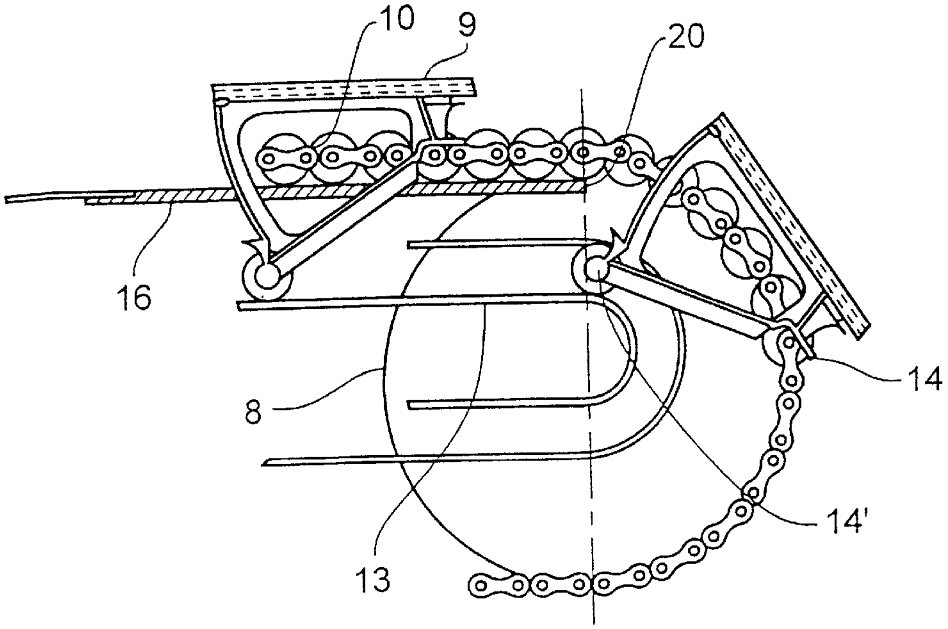
FIG. 6 (PRIOR ART)
FIG. 6 is a view showing the upper rail during the clockwise operation of the conventional passenger conveyor.
Figure 7:
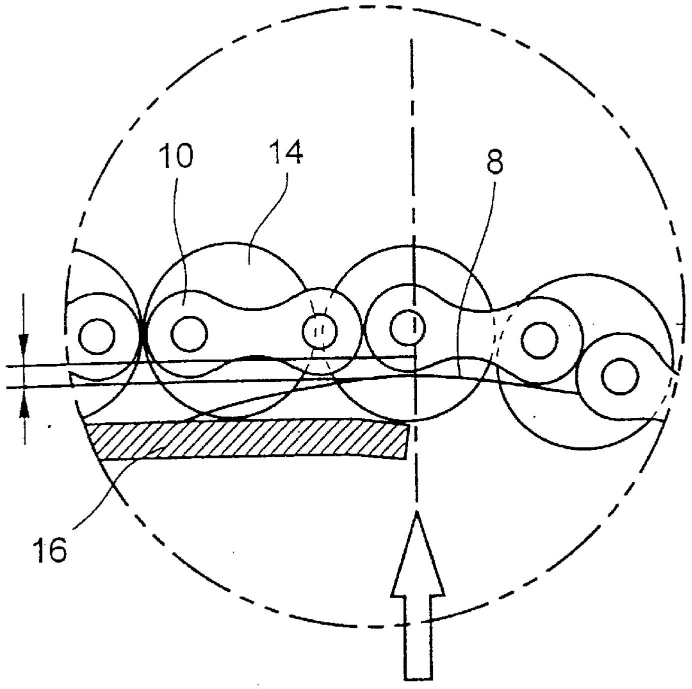
FIG. 7 (PRIOR ART)
FIG. 7 is a view showing the impacting portion during the clockwise operation of the conventional passenger conveyor.
Figure 8:
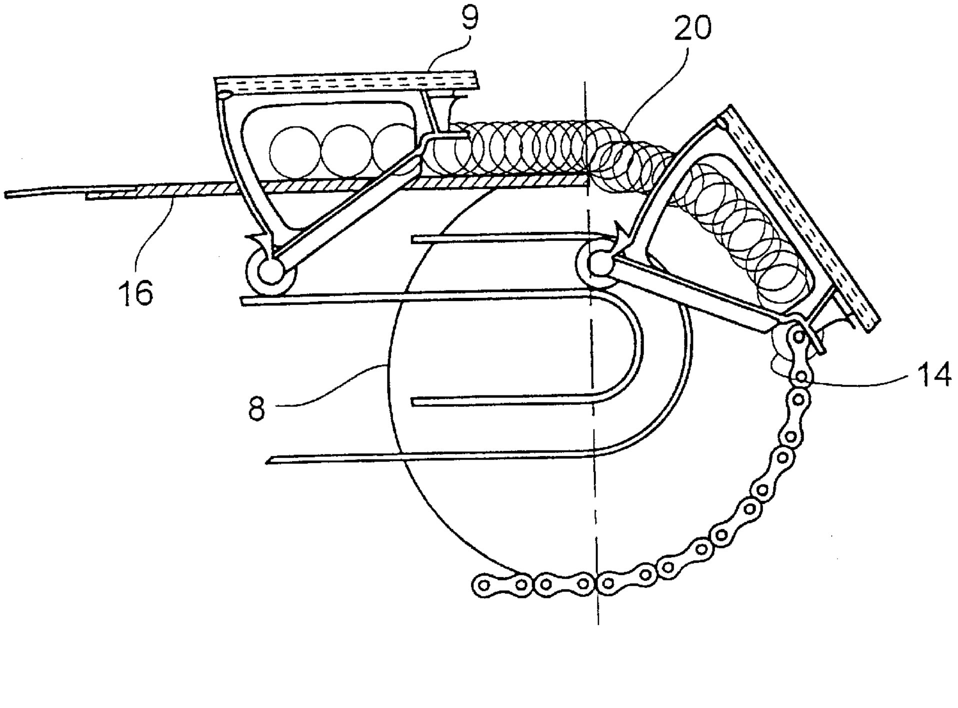
FIG. 8 (PRIOR ART)
FIG. 8 is a view showing the abutting of the upper rail during the counter-clockwise operation of the conventional passenger conveyor.
Figure 9:
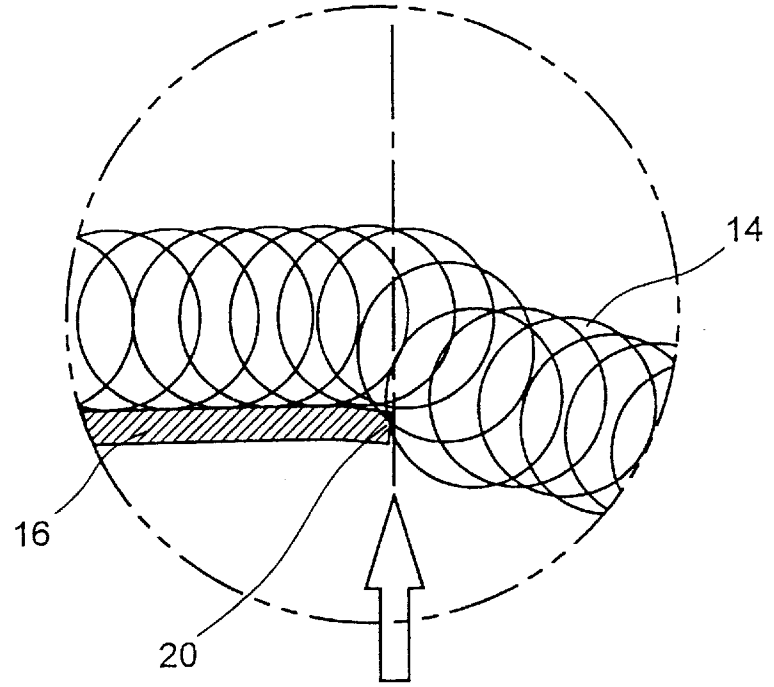
FIG. 9 (PRIOR ART)
FIG. 9 is an enlarged view showing the abutting of the upper rail during the counter-clockwise operation of the conventional passenger conveyor.
Figure 10:
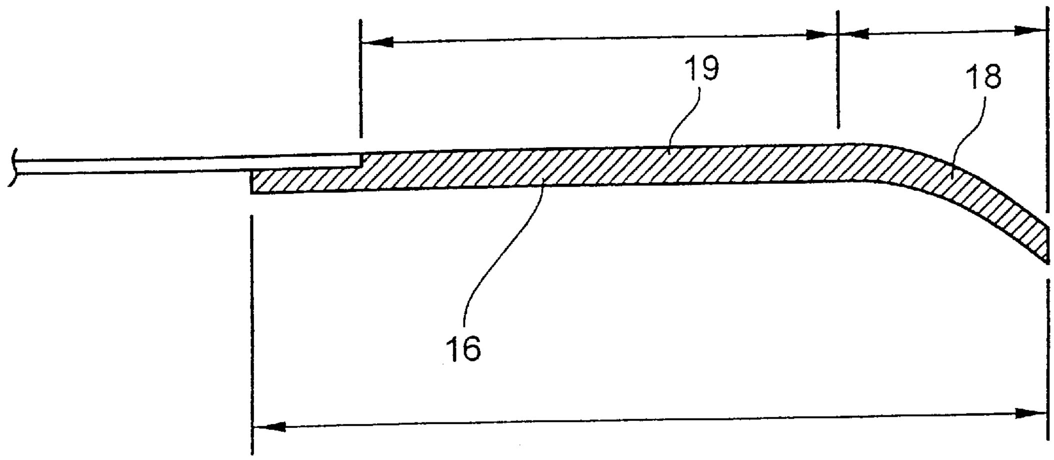
FIG. 10 is a sectional view showing the upper rail for a passenger conveyor according to the present invention.
Figure 11:
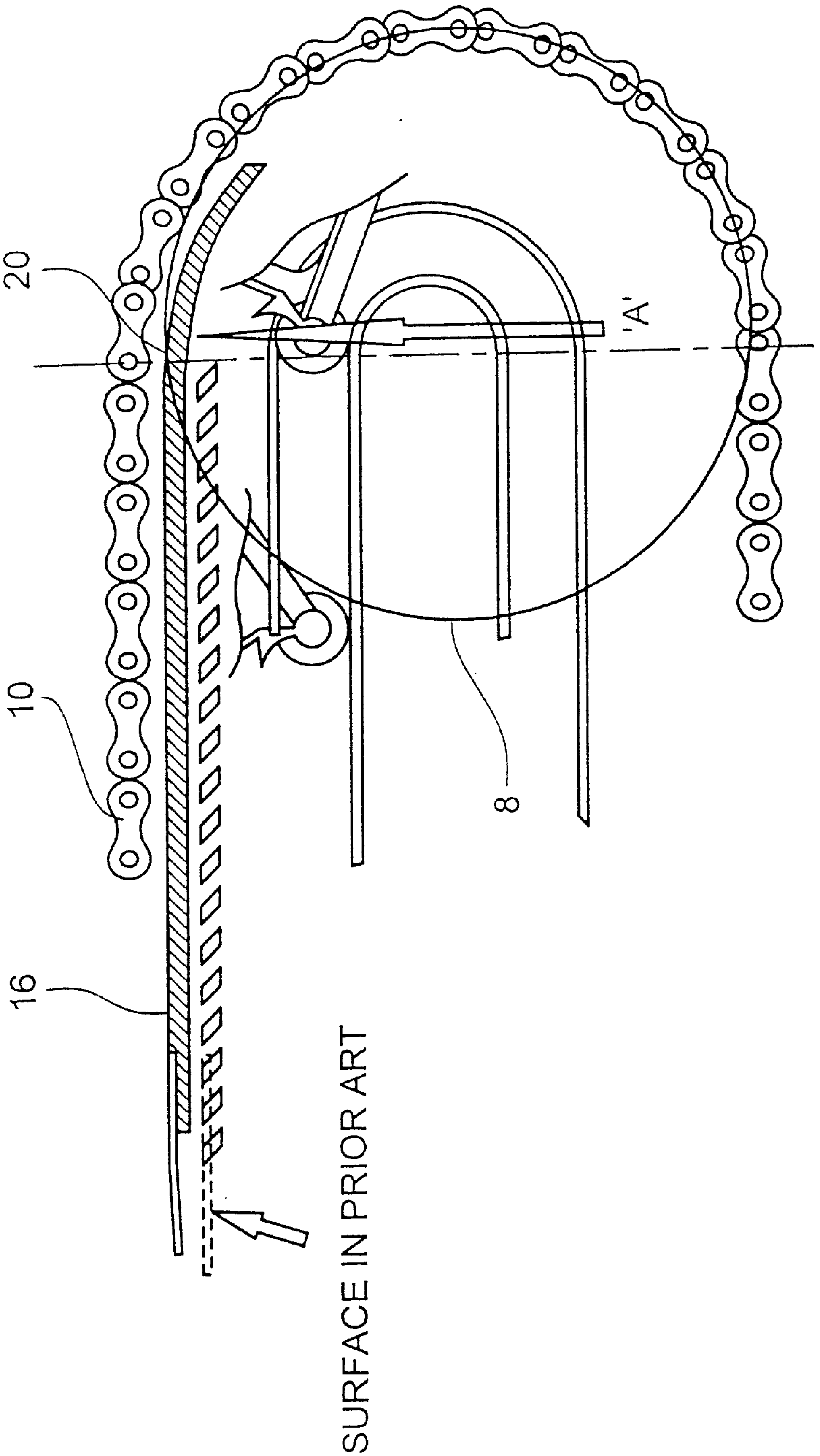
FIG. 11 is a side view showing the operation of the upper rail for a passenger conveyor according to the present invention.

Referring to FIGS. 10 to 14, the upper rail for a passenger conveyor according to the present invention comprises a straight section 19 formed in a straight, and an extended arched section 18 formed at the end of the straight section 19, to guide the front wheel roller 14 of the step. As shown in FIGS. 12*a* and 12*b*, the distance "t" from the upper surface of the straight section of the upper rail 16 to the circumferential surface of the terminal gear 8 for driving the step chains is shorter than the radius "r" of the front wheel roller 14 of the step, and the end "A" of the straight section 19, i.e., the portion from which the arched section 18 starts is somewhat beyond the perpendicular center line of the terminal gear 8.

Figure 12A:
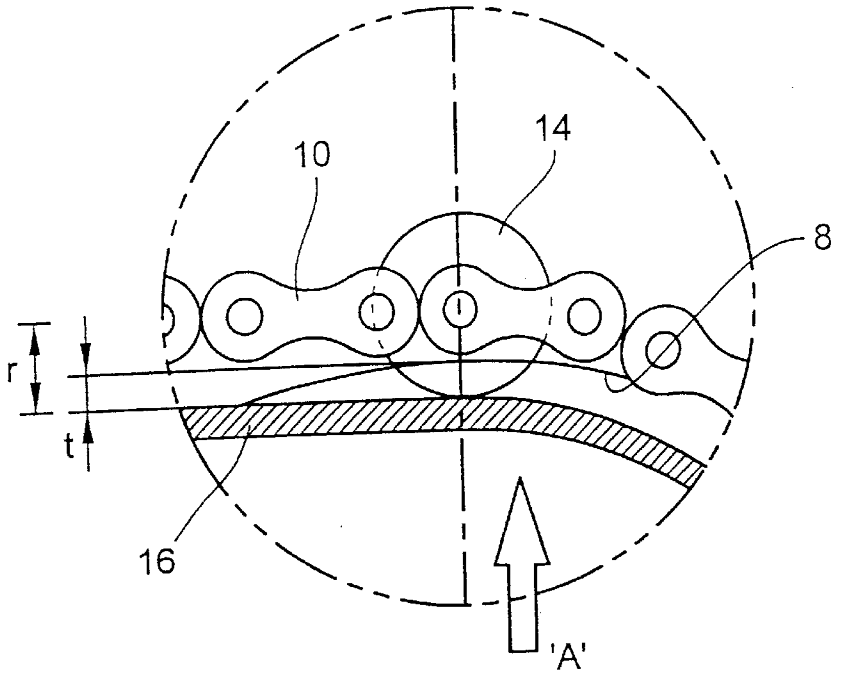
FIGS. 12A and 12B are enlarged views showing the movement of the proximal portion of the arched section of the upper rail for a passenger conveyor according to the present invention.
Figure 12B:
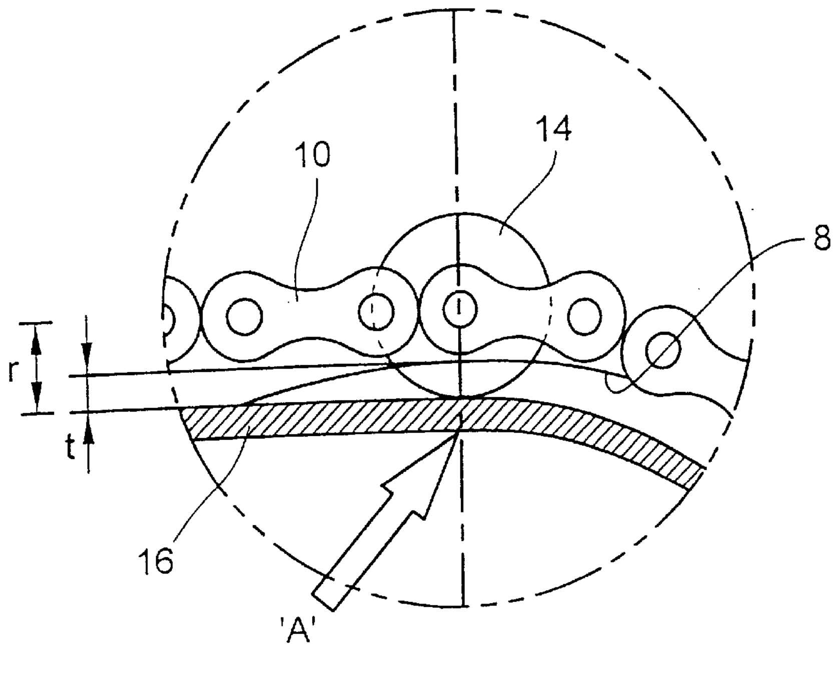
Figure 13:
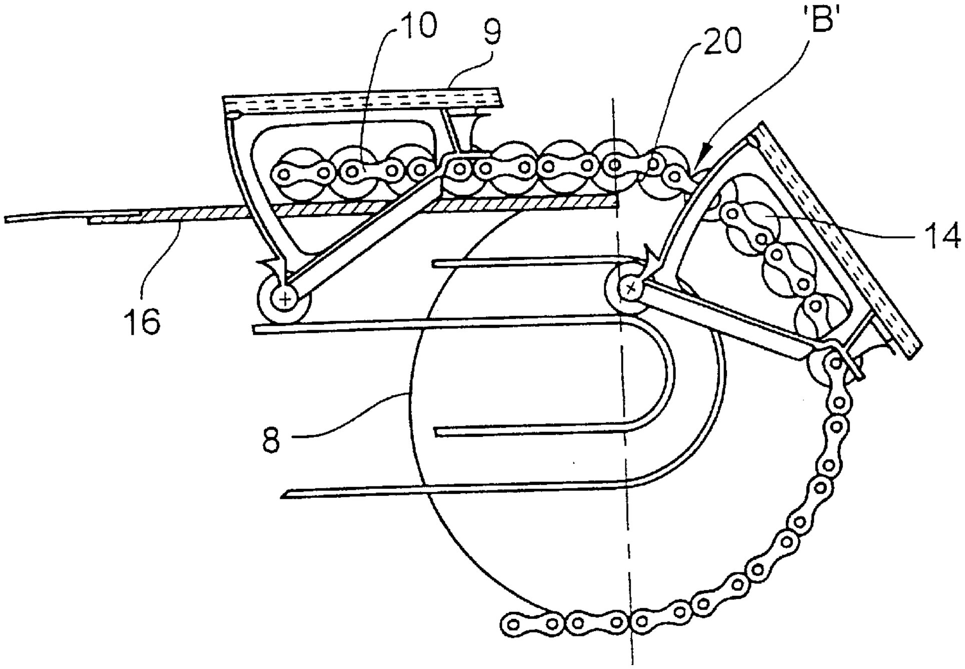
FIG. 13 is a view showing the clockwise and counter-clockwise operations of the upper rail for a passenger conveyor according to the present invention.

According to another embodiment, the end "A" of the straight section 19 is preferably formed to be coincided with the perpendicular center line of the terminal gear 8 as shown in FIG. 12B.

The length of the arched section 18 is extended to be an ⅛ of that of the terminal gear 8, and the curvature of the arched section is same or shorter than that of the terminal gear 8.

Preferably, the width of the rail is larger than the width of the front wheel roller 14 of the step so that interference with the circumferential components may be prevented during movement of the conveyor.

The straight section 19 has a desired thickness with a resilient force capable of withstanding the load of the front wheel roller of the step, and is made of a mild steel, thereby performing the role of a damper.

Each of a pair of upper rails 16 is disposed in horizontally spaced state on both sides of the passenger conveyor, and secured by the bracket of the frame. A liner is interposed between the bracket and the upper rail to adjust the height of the upper rail.

The operation of the upper rail for the passenger conveyor according to the present invention as constructed above will be described in detail.

Figure 14:
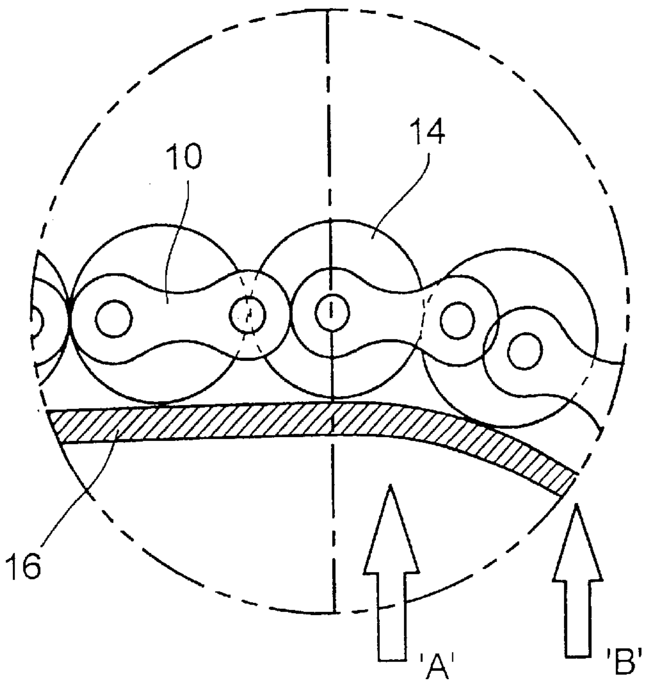
FIG. 14 is a partially enlarged view of a circle 20 in FIG. 13, explaining the clockwise and counter-clockwise operations of the proximal and distal portions of the upper rail for a passenger conveyor according to the present invention.

When the passenger conveyor moves, the step 9 is traveled in a clockwise or counter-clockwise by the drive terminal gear 8 and the driven terminal gear. Especially when step chain would be geared with the terminal gear 8, the front wheel roller 14 of the step coupled to the step chains moves along the upper rail 16. At this time, the straight section 19 and arched section 18 of the upper rail positioned near the terminal gear performs the role of a guide for front wheel roller 14, as shown in FIG. 14, so that the step chains may not be geared with the terminal gear at the abutting portion 20 but smoothly engaged with the tooth of the terminal gear 8 of a section "B". At every time the front wheel roller 14 leaves or lands on the arched section 18 of the upper rail, the front wheel roller of the step can be smoothly landed on the upper rail during the clockwise or counter-clockwise movement thereof. When the conveyor moves in a clockwise direction, the upper rail is disposed at the higher position than the prior art, so the upper rail can be engaged to the terminal gear without producing the impact at the abutting portion. Also, when moving in counter-clockwise, because the curvature of the arched section 18 of the upper rail is same or shorter than that of the terminal gear 8, thereby preventing the front wheel roller from impacting against the arched section and guiding the smooth entrance. Accordingly, when the conveyor turns in a clockwise or counter-clockwise direction, the impacting sound and vibration between the terminal gear 8 and the step chains 10 can be reduced significantly.

While the present invention has been described and illustrates herein with reference to the preferred embodiments thereof, it will be understood by those skilled in the art that various changes in form and details may be made therein without departing from the spirit and scope of the invention.

What is claimed is:

1. A passenger conveyor comprising:

a drive motor including a drive shaft, a drive sprocket coupled to the shaft of the drive motor, a drive terminal gear coaxially engaged with the drive sprocket, a step chain meshed with the drive terminal gear so as to be driven thereby, at least one step connected to the step chain and having first and second wheel rollers provided at opposite sides thereof, and an upper rail for guiding the first wheel roller so that the step chain meshes smoothly with the drive terminal gear, wherein the upper rail comprises a straight section and an arched section extending from an end of the straight section, wherein a location at which the arched section starts and the straight section terminates is located at or beyond a perpendicular center line of the terminal gear, wherein a distance from an upper surface of the straight section to a circumferencial surface of the terminal gear is shorter than a radius of the front wheel roller.

2. The upper rail as claimed in claim 1, wherein a length of the arched section is ⅛ the circumference of the terminal gear.

3. The upper rail as claimed in claim 1, wherein a curvature of the arched section is at most that of the terminal gear.

* * * * *